United States Patent [19]

Kalt

[11] 4,266,339
[45] May 12, 1981

[54] METHOD FOR MAKING ROLLING ELECTRODE FOR ELECTROSTATIC DEVICE

[75] Inventor: Charles G. Kalt, Williamstown, Mass.

[73] Assignee: Dielectric Systems International, Inc., North Adams, Mass.

[21] Appl. No.: 46,270

[22] Filed: Jun. 7, 1979

[51] Int. Cl.³ .............................................. H05K 3/00
[52] U.S. Cl. ................................... 29/829; 29/592 R; 264/104; 427/123
[58] Field of Search ............... 156/192, 222, 162, 160; 29/592, 825, 829; 428/906; 427/123, 124; 264/104, 235

[56] References Cited

U.S. PATENT DOCUMENTS

| | | | |
|---|---|---|---|
| 3,899,807 | 8/1975 | Sovish et al. | 156/83 X |
| 3,988,399 | 10/1976 | Evans | 264/235 X |
| 3,989,357 | 11/1976 | Kalt | 350/360 |

*Primary Examiner*—Lowell A. Larson
*Assistant Examiner*—C. J. Arles
*Attorney, Agent, or Firm*—Arthur K. Hooks

[57] ABSTRACT

A method for making a rolling electrode for use in an electrostatically controllable device includes depositing a metal film on only one surface of a tentered plastic sheet, heating to a temperature substantially above the softening temperature of the plastic and cooling to shrink the plastic and to cause the plastic sheet to form a tight roll.

12 Claims, 3 Drawing Figures

METHOD FOR MAKING ROLLING ELECTRODE FOR ELECTROSTATIC DEVICE

BACKGROUND OF THE INVENTION

This invention relates to a method for making a rolling electrode for use in an electrostatic device.

An electrostatic device is described in my U.S. Pat. No. 3,989,357, issued Nov. 2, 1976, wherein an electrically conducting sheet in the form of a spiral roll may be caused to unroll and become coadunate with an adjacent fixed electrode. The sheet may be composed of a plastic material on which there has been deposited one or more metal films. The roll is formed by winding the sheet about a mandrel, heating the wound sheet and removing the mandrel causing the sheet to take a set in the form of the mandrel.

Such a device may be used as an electrically controlled venetian blind or as a display device. For such use, the ratio of the amount of window area blocked by the rolled electrode to the amount of window are a blocked when the electrode is unrolled should be made as small as possible. A tight small roll of many turns is required to achieve a high window-blind efficiency, or to achieve a near unity ratio of active area to total display device area.

It is therefore an object of the present invention to provide a method for making a rolling electrode having a small rolled diameter compared with the extended length of the electrode.

SUMMARY OF THE INVENTION

A method for making a rolling electrode for use in an electrostatically controllable device includes depositing a metal film on only one surface of a tentered and unrelieved plastic sheet, heating the metallized sheet to a temperature substantially above the softening temperature of the plastic and cooling the sheet. The plastic is caused to shrink by heating and cooling steps while the metal film tends to retain its original dimensions. This causes the metallized sheet to curl and form a tight roll. The outermost end of the roll may be attached to the insulated surface of a fixed electrode to form a roll-out type electrostatic device.

In one embodiment of this method, a tentered and metallized plastic sheet is punched or cut to form a plurality of U-shaped incisions in a matrix pattern. The sheet is then selectively shielded in areas not encompassed by each U-shaped incision and the shielded sheet is heated as before and cooled to cause the plurality of sheet portions encompassed by the U-shaped incisions to curl and roll up simultaneously.

DESCRIPTION OF THE PREFERRED EMBODIMENTS

Figure 1:
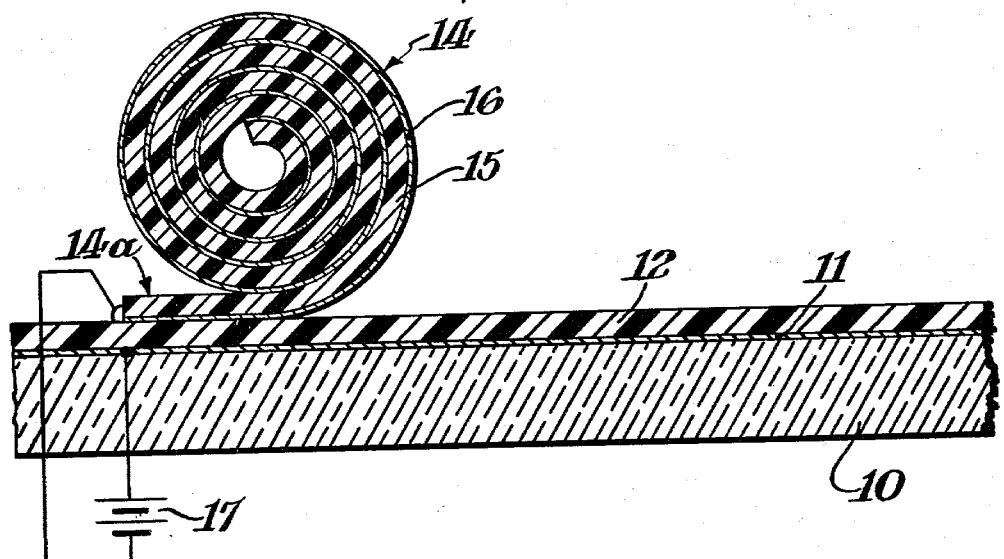
FIG. 1 shows in side sectional view a portion of an electrostatic device of this invention having a rolling electrode.

The electrostatic device of FIG. 1 includes a glass substrate 10, a film 11 of transparent electrically conductive tin oxide deposited on the surface of the glass 10, and a layer 12 of 2 microns thick clear polypropylene overlying the conductive film 11. A variable electrode 14 consists of a 2 microns thick polyethylene terephthalate (MYLAR) sheet 15 having on one surface an aluminum film 16 of about 1000 angstroms thickness. The electrode 14 is shown at rest wound in a tight roll. MYLAR is a Tradename of E. I. DuPont, Wilmington, Del. Plastic sheets as thin as 0.5 microns are possible to obtain and it is postulated that even thinner sheets will be operable and useful for miniature display devices.

Figure 2:
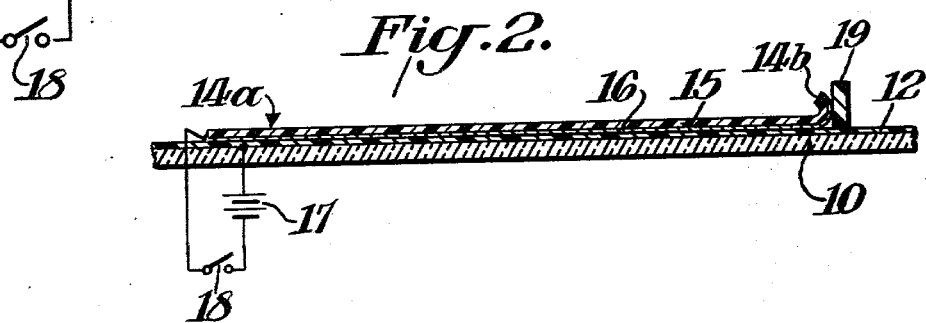
FIG. 2 shows in side sectional view, and to a reduced scale, the device of FIG. 1 in an electrically actuated rolled-out condition.

The outermost end 14a of the electrode 14 is bonded to the insulative layer 12. A battery 17 and a switch 18 are connected in series and then between the conductive films 11 and 16. When the switch 18 is closed and the variable electrode 14 is attracted to the fixed electrode 11 and rolls out as illustrated in FIG. 2, electrode 14 is prevented from completely unrolling by a bar stop 19, seen in end view. The bar stop preferably extends along the entire outer edge 14b of electrode 14. The stop 19 serves to maintain the axis of the curled edge 14b at right angles to the direction of unrolling so that when the switch 18 is opened, the electrode 14 will re-roll squarely to its original position.

An electrostatic device such as that illustrated in FIG. 1 and described above was built with a variable electrode 14 that is 2.0 inches (5.1 cm) wide and when unrolled extends 1.0 inch (2.5 cm). When electrode 14 is at rest in a roll as illustrated in FIG. 1, the diameter of the variable electrode roll is 0.03 inch (0.76 cm), and thus the roll consists of about eleven turns. The variable electrode 14 of FIG. 1 shows fewer turns and the thicknesses of the sheet 15, the films 11 and 17, and the layer 12 are exaggerated to achieve clarity in the details of the drawing.

The electrode 14 was made by the following method. An aluminum film of about 1000 angstroms (0.1 microns) thickness was deposited on a 2 microns thick tentered and yet unrelieved MYLAR sheet by a standard vacuum evaporation process. A 1×2 inch piece was cut from the metallized sheet, the piece was held at one short (1 inch) edge by clamping it metal down to a flat glass plate and the assembly was placed in an oven and heated to 225° F. for 2 minutes after which it was removed and allowed to cool.

During the heating-cooling, the MYLAR piece 15 shrinks more than the aluminum film 16 and consequently the free end of the piece rolls up tightly as illustrated in FIG. 1, to become the variable electrode 14.

Polyethylene terephthalate (MYLAR) sheet, being tentered and unrelieved, shrinks about 0.5 percent when heated and tenter-relieved at 110° C. and shrinks 10 percent at a tenter-relieving temperature of 220° C. Thin tentered and unrelieved polyimide (KAPTON) sheet, upon being heated to a temperature of 250° C. typically shrinks 0.3 percent, 2.5 percent at 300° C. and at 400° C. a 0.001 inch (0.025 mm) thick sheet shrinks 3.5 percent.

From geometrical considerations it can be shown that a sheet of 0.005 inch (0.013 mm) plastic formed in a roll of 0.1 inch (2.5 mm) diameter will have an outside circumference 0.5 percent greater than the inside circumference. A roll of such a sheet having been metallized on the outer surface and with the innermost turn of the above said diameter of 0.1 inch will have 20 turns corresponding to a roll diameter of 0.2 inch (5.1 mm). The indicated window blind efficiency of such an electrode would be 18.4 inches/18.6 inches or 0.99. The sheet in this roll will have a 0.5 percent greater outside circumference than inside, suggesting that achieving 0.5 percent shrinkage would be sufficient to form this roll. However, a useful roll is necessarily a springy tight roll having tensions on both faces of the sheet. In practice it requires much more shrinkage than would be indicated by such an oversimplified analyses.

From such considerations it is found desirable in the heating step of the method of this invention to achieve a shrinkage of the plastic sheet greater than 0.5 percent and preferably at least as great as 1.0 percent in order to achieve a tight electrode roll of sheets having a thickness as great as 0.5 mil (0.013 mm).

It is believed that any plastic material will be effective in the method of this invention. A tentered metallized polyimide (KAPTON) sheet has been mildly curled in this manner, heating at 500° F. (260° C.) which is the maximum temperature of the particular oven used. This provided an experimental variable rolling electrode that may be used in light gates that must operate at higher temperatures, e.g. up to 85° C. or more. KAPTON is a Tradename of E. I. DuPont, Wilmington, Del. Roll electrodes of polyimide, and other high temperature plastics such as polysulfone and the fluorocarbons, are expected to be particularly well suited for use in the shuttering of greenhouses, solariums and other solar heated spaces.

Figure 3:
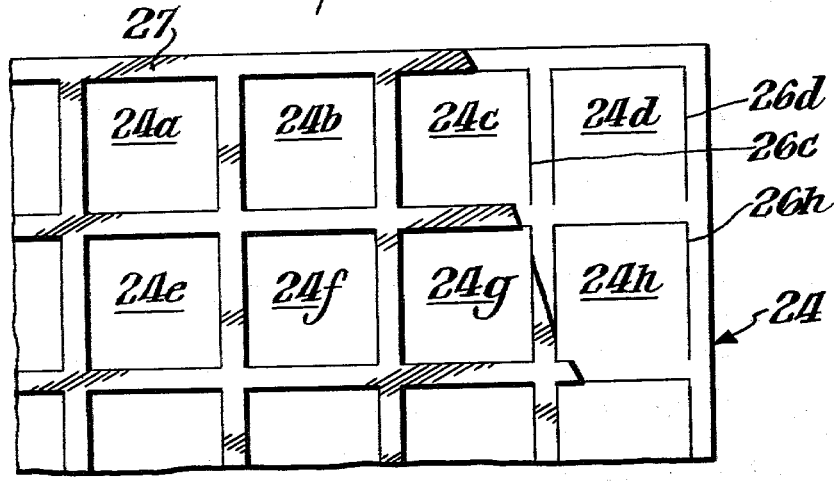
FIG. 3 shows a metallized plastic sheet of this invention with the metal down and a metal mask placed thereover. The mask is partially cut away to reveal U-shaped incisions in the plastic.

In a modification of the above method for making a large number of rolled variable electrodes and with reference to FIG. 3, a metallized plastic sheet 24 with metal film down is cut or punched to form a plurality of U-shaped incisions 26 through the sheet 24. Then a metal mask or heat shield 27 is laid over the sheet 24 that covers all areas of the sheet 24 except those areas encompassed by each U-shaped incision 26. The inverted U-shaped incisions 26c, 26d and 26h are most clearly shown in the mask-cutaway area in FIG. 3. This assembly is then heated for about a minute and subsequently cooled so that each unmasked piece of the sheet, e.g. areas 24a through 24h, curls up into a tight roll toward the bottom in the FIG. 3 of each area 24a through 24h, respectively. Of course heating must be at below the plastic melting temperature to preserve the integrity of the plastic sheet 24. The metal shield is preferably thick enough that it rises only a few degrees in temperature during its brief exposure to the heat which effects the simultaneous curling and rolling of the variable electrodes.

It has been found that an especially effective means for applying the heat consists of holding, metal-down, an end of each metallized plastic piece to be curled, and directing a planar hot air stream at the piece simultaneously at a plurality of pieces in a line that is moved at a constant speed from the free end of the piece (pieces) toward the held end (ends). It is also possible to vary the speed of the moving heat source when it is desired to obtain more shrinkage and thus greater roll tension in a portion of each piece relative to other portions. It was further discovered that by a momentary dwelling or by a relatively slow movement of the heat source at the free end of the piece, that this free end may be advantageously stiffered or hardened so that when installed in a display device as shown in FIG. 1, the piece (e.g. 14) after having been rolled out and the voltage removed, will re-roll more evenly and without skew.

The unitary multiple variable electrode 24 may now be bonded to a single insulated fixed electrode, such as the laminar subassembly consisting of substrate 10, film 11 and layer 12 in FIG. 1. In this embodiment the rolled electrodes 24a through 24h etc. all are electrically connected together so that application of a voltage between any one point on the conducting film of sheet 24 and the common fixed electrode (not shown) will actuate all variable electrodes 24a through 24h etc. simultaneously. Alternatively, the film 25 may be removed in regions (not shown) that separate the film into individual patches of the film each corresponding to one of the above-mentioned areas (e.g. 24h) of the sheet 24 that is encompassed by one of the U-shaped incisions (e.g. 26h), so that each variable electrode may be actuated individually.

In yet another modification of the above-described curling method, the metallized sheet is wrapped metal down or metal up about a large diameter, e.g. 1 inch mandrel. The wrapped mandrel is then placed in an oven at above the ironing temperature and cooled. Subsequently the metallized film is removed from the mandrel at which time it forms a tight roll (with metal outward) that is much smaller than the mandrel. This method is especially useful for curling very long sheets using a small oven space.

In another variation, the metallized sheet is held flat between two plates during the heating and cooling steps. The holding during heating may alternatively be accomplished by holding the sheet coadunate to an electrically conductive piece or plate with an insulative layer (the plastic of the metallized sheet or a separate insulative layer) placed between the conductive piece and the metal film, and applying a voltage therebetween to effect electrostatic holding. Thus during heating, the surface to which the electrode may be held may be cylindrical or flat depending only upon what shape is most convenient for holding. Electrostatic holding is especially useful when the above described moving-heat-line technique is used.

For all of the above described holding and heating-cooling techniques, the cutting may be accomplished in general at anytime, i.e. before or after holding, and/or heating, and/or cooling.

The cutting may be accomplished by drawing a knife or razor blade through the plastic sheet or shearing as with scissors. However, it is preferred to hold the sheet against a cushioning layer, such as 0.05 wide (0.13 cm) thick plastic, e.g. polyethylene terephthalate; a razor blade having the length of the desired cut is then pressed down and through the metallized sheet and at least part way through the cushion. Another blade held at right angles to the first blade is then pressed through the metallized sheet to obtain another portion of the desired incision. For cutting many pieces from a large sheet, the blades may be ganged.

It will be appreciated from the foregoing that an electrostatic device of the present invention has multiple advantages. Either a single or a multiple variable electrode device can be made by the relatively simple method described above that leads to a tight roll of many turns. Thus in the rolled condition the diameter of the variable electrode blocks a minimum amount of light, heat or other forms of electromagnetic radiation from passing through the "window". Further, the many-turned roll extends to cover and block a relatively large window area when actuated and unrolled. For example, the device described and illustrated in FIG. 1 blocks only 3% of the window area in the unexcited and "open" state. Such devices are particularly well suited for use in an electrically controlled venetian blind in an office building, a home or a greenhouse window, and such blinds are readily adapted for either manual or automatic control of living spaces temperature, admitting sunlight and heat during the day and retaining radiant energy at night.

What is claimed is:

1. A method for making an electrostatically controllable device having a rolling electrode comprising:
    (a) depositing a metal film on only one side of a tentered plastic sheet;
    (b) heating said tentered sheet to a temperature greater than that corresponding to the 0.5 percent tenter-relief shrinkage characteristic of said sheet;
    (c) cooling said sheet to shrink said plastic and to cause said metallized sheet to cure metal-outward to form a tight roll; and
    (d) attaching the outermost end of said roll to an insulated surface of a fixed electrode so that when a voltage is impressed between said metallized plastic sheet and said fixed electrode, said tight roll is attracted to said fixed electrode and is unrolled.

2. The method of claim 1 wherein said sheet is selected from polyethylene terephthalate, polyimide, polysulfone, and polyfluorocarbon.

3. The method of claim 1 wherein said sheet is polyethylene terephthalate and said heating is at a temperature greater than 110° C.

4. The method of claim 1 wherein said sheet is polyimide and said heating is at a temperature greater than 300° C.

5. The method of claim 1 wherein said heating is accomplished by applying heat to said sheet in a line perpendicular to the desired direction of curling and sweeping said line across said sheet.

6. The method of claim 5 additionally comprising holding one edge portion of said metallized sheet during said heating, said sweeping being in a direction away from said held edge.

7. The method of claim 1 additionally comprising stiffening one end of said sheet.

8. The method of claim 7 whereby said stiffening is accomplished by selectively heating said one end to a temperature greater than that of said heating to curl said sheet.

9. A method for making a plurality of rolling electrodes comprising:
    (a) depositing a metal film on only one side of a tentered plastic sheet;
    (b) cutting through said sheet to form a plurality of U-shaped incisions in said sheet;
    (c) heating said sheet; and
    (d) cooling said sheet to cause each of the portions of said sheet being within one of said U-shaped incisions to curl and form a tight roll.

10. The method of claim 9 additionally comprising placing a heat shield over said sheets prior to said heating, said shield having openings in areas corresponding to the areas of said sheet that are encompassed by each of said U-shaped incisions.

11. The method of claim 9 wherein said shield is made of sheet metal.

12. The method of claim 11 additionally comprising bonding the portion of said sheet without said U-shaped incisions to an insulated fixed electrode to form a multiple-variable-electrode electrostatically-controllable device.

* * * * *